United States Patent [19]
Weiss

[11] 3,926,526
[45] Dec. 16, 1975

[54] FLOW CELL
[76] Inventor: Gunther Weiss, 2025 SW. Briggs Court, Beaverton, Oreg. 97005
[22] Filed: May 28, 1974
[21] Appl. No.: 473,359

[52] U.S. Cl. .................. 356/246; 350/63; 356/181
[51] Int. Cl.² ......................................... G01N 1/10
[58] Field of Search ............ 356/181, 246; 250/576; 350/63

[56] References Cited
UNITED STATES PATENTS

| | | | |
|---|---|---|---|
| 3,418,061 | 12/1968 | Schultz | 356/246 |
| 3,419,722 | 12/1968 | Meikle | 250/576 |
| 3,689,164 | 9/1972 | Riley | 356/246 |

Primary Examiner—James B. Mullins
Attorney, Agent, or Firm—Kolisch, Hartwell, Dickinson & Stuart

[57] ABSTRACT

A flow cell for containing fluid during the analysis thereof, including means defining a chamber for holding fluid, and flow-through supply and exhaust conduit means communicating with the chamber for the supplying and exhausting of fluid from the chamber during flow of fluid through the cell. Opposed windows are provided at one set of opposed extremities of the chamber, and the supply and exhaust conduit means communicate with said chamber through a wall bounding one of opposed extremities of the chamber in a dimension transverse to the extremities bounded by the windows. Fluid entering the chamber enters while flowing counter to the flow of fluid leaving the chamber. The supply conduit means includes branched conduit portions, with one conduit portion communicating with the chamber at a location adjacent one window, and another conduit portion communicating with the chamber at a location adjacent another window. The exhaust conduit means communicates with the chamber at a location intermediate these first-mentioned locations.

5 Claims, 3 Drawing Figures

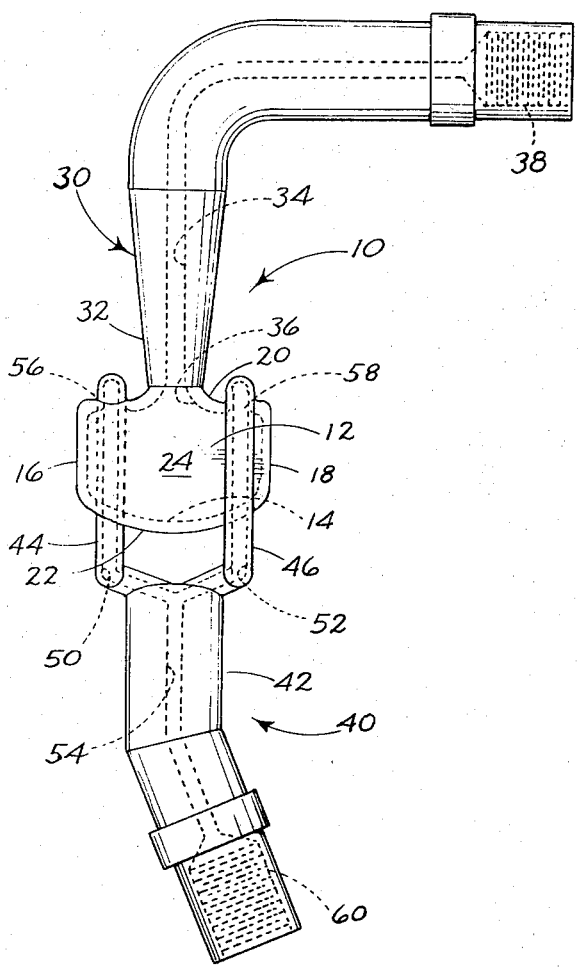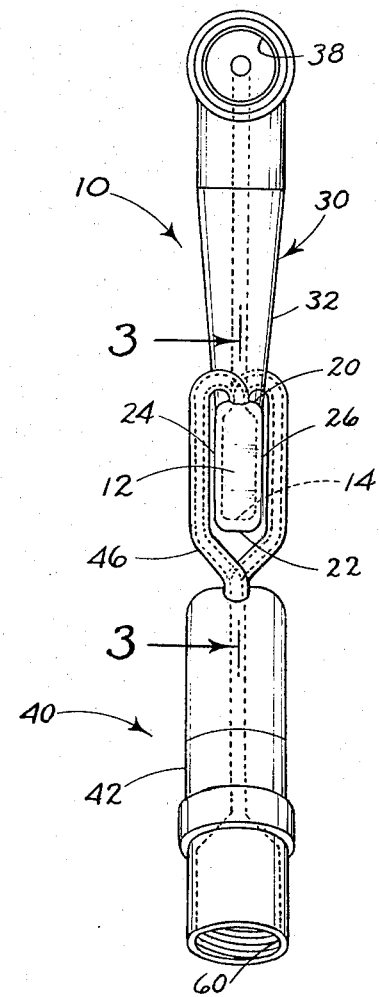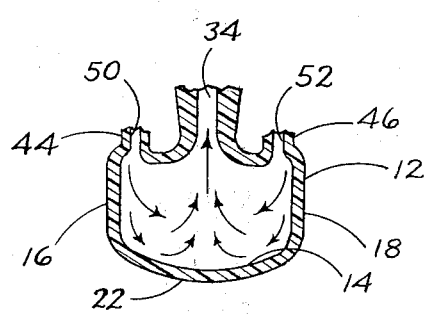
Fig. 1.
Fig. 2.
Fig. 3.

FLOW CELL

This invention relates to what is commonly referred to as a flow cell, usable in containing a quantity of fluid during the making of an analysis thereof. A flow cell, sometimes also known as a sampling cell, may be used in a number of instruments performing optical measuring or monitoring of fluids, and typically includes opposed transparent windows placed in the path of visible or invisible light during the making of an analysis.

In making the analysis of different samples, particularly if a large number of such samples are involved, the use of a so-called microsystem has a number of advantages. Further explaining, if an appropriate analysis can be made on a relatively small amount of material, the amount of any reagent or reagents needed to prepare a sample for the analysis is reduced, which obviously results in economies. In some instances, the amount of material available for testing is limited, as, for instance, when making an analysis of the blood serum of an infant, where there is a practical limit as to the amount of blood which may be withdrawn from a child. With automated or semiautomated systems, it should be obvious that with a reduction in the size of the test tubes or other containers containing samples prepared for analysis, ease of handling results. For the aforementioned and other reasons, the provision of a flow cell which can effectively handle small samples for testing or other purposes must be considered an important contribution to the art.

An important part of the instant invention is the provision of a flow cell featuring a unique construction for the channeling of a fluid sample through the cell, which promotes purging with new sample of old sample in a chamber region of the cell where optical measuring or monitoring takes place. By reason of the construction, and in the testing or other analysis of succeeding samples using the cell, for a cell of a given size, a markedly reduced amount of the sample which is to be admitted to the cell for analysis need be required to wash out remnants of old sample and to fill the chamber in the cell with substantially uncontaminated new sample.

A general object of the invention, therefore, is to provide a novel cell usable in optical monitoring or measuring applications having a construction which promotes purging of old sample with the introduction of a new sample thereinto.

More specifically, an object of the invention is to provide such a cell where the flow of a sample through the cell upon the introduction of the sample is accomplished with the sample effective to sweep across window regions in an optical chamber in the cell, and then leave such chamber in a manner promoting effective purging of old sample with the use of a minimal amount of new sample.

In a preferred embodiment of the invention, the cell contemplated comprises a unitary transparent body including a portion defining a chamber for holding the sample during the making of an analysis thereof, and supply and exhaust conduit sections projecting outwardly from opposite extremities of the means defining the chamber. The supply conduit section includes branched conduit portions straddling the means defining the chamber, and communicating with such chamber on the same side or extremity of the chamber as the side where the exhaust conduit section communicates with the chamber. One conduit portion is effective to direct incoming sample across one window of the optical chamber in the cell and the other conduit portion is effective to direct incoming sample across the other window of such chamber, with exhaust of sample from such chamber being in a direction counter to the direction of inflowing sample and taking place at a location which is intermediate the locations where inflow takes place.

These and other objects and advantages will become more fully apparent from a reading of the following description, which is to be taken in conjunction with the accompanying drawings, wherein:

FIG. 1 is a side elevational view of a flow cell constructed according to an embodiment of the invention, on a somewhat enlarged scale;

FIG. 2 is another side elevational view of the cell in FIG. 1, viewing the cell from the right in FIG. 1; and FIG. 3 is a diagrammatic illustration of an optical chamber in the cell, showing how fluid flow takes place therethrough with the introduction of a sample into the cell.

Referring now to the drawings, the flow cell pictured comprises a unitary or integral transparent body 10, which may be made of plastic, or a suitable heat-resistant glass, such as the product sold under the name "Pyrex". Body 10 includes a portion 12 defining a reservoir or chamber 14 in the cell utilized to hold that portion of a sample which is subjected to optical analysis.

Chamber 14, also sometimes referred to herein as an optical chamber, is bounded at left and right hand extremities (as seen in FIG. 1) by transparent wall expanses 16 and 18, also referred to herein as window regions or windows. With use of the cell, these confronting spaced windows are placed in the path of light in the making of an optical determination with respect to the contents of the chamber. Top and bottom extremities of chamber 14 in FIG. 1 are bounded by top wall 20 and slightly dished bottom wall 22. Side walls 24 and 26 integral with walls 20, 22 and the windows complete the means defining chamber 14 in the cell illustrated.

Sample fluid leaves chamber 14 in the cell through what is generally referred to herein as a flow-through exhaust conduit means depicted at 30. Specifically such comprises a tube section 32 projecting outwardly from the upper extremity of chamber 14 in FIG. 1, this tube section being part of body 10. Passage 34 within tube section 32 communicates with chamber 14 at a location 36 disposed intermediate windows 16, 18, with this location in the usual instance being essentially midway between these windows. As a consequence, it may generally be said that the exhaust conduit means communicates with the chamber through wall 20 which bounds the upper extremity of the chamber, at a location intermediate windows 16, 18.

Tube section 32 may be threaded as at 38 to facilitate mounting of the cell in the equipment with which it is used. In many instances, vacuum is utilized to pull a sample into and through the cell, and in such instance the threaded end 38 would be connected to a suitable selectively operated vacuum source.

Shown generally at 40, and also part of body 10, is what is referred to herein as a flow-through supply conduit means utilized in the admission of a sample to chamber 14. Supply conduit means 40 specifically comprises a tube section 42 projecting downwardly from the bottom extremity of chamber 14 in FIG. 1, and branched conduit portions 44, 46 integral at their lower set of ends with tube section 42 and joined at upper extremities to wall 20 of chamber 14.

Conduit portions 44, 46 have internal passages 50, 52 joining with passage 54 in tube section 42. Passage 50 of conduit portion 44 joins with chamber 14 at a location 56 disposed adjacent and above window 16 in FIG. 1. Passage 52 in conduit portion 46 joins with chamber 14 at a location 58 above and adjacent window 18 in FIG. 1. Thus, the supply conduit means communicates with chamber 14 through the same wall as the wall through which communication between the chamber and the exhaust conduit means is established. Specifically, communication of the supply conduit means with chamber 14 is at two locations disposed on either side of location 36 where exhaust flow takes place.

The bottom end of tube section 42 may be threaded, as at 60. A capillary tube or other device may be attached to this threaded end, whereby a sample from a source such as a test tube may be drawn up into the cell for measurement purposes.

As can probably best be seen with reference to FIG. 3, when a new sample is drawn into the cell, the fluid of the sample is channeled into chamber 14 through passages 50, 52, with such fluid then flowing downwardly in FIG. 3 past the windows 16, 18 and against dished wall 22 bounding the lower extremity of chamber 14. Fluid leaving the chamber travels generally upwardly in chamber 14 in a region intermediate the windows, and thence into passage 34 of the tube section 32. Thus, fluid entering the chamber enters while flowing counter to the flow of fluid leaving the chamber. A sweeping action takes place which is effective substantially to completely purge the chamber of traces of an already tested sample upon the introduction of a new sample into the cell.

As can be seen in FIG. 2, conduit portions 44, 46 where they lead to top wall of chamber 14 straddle the means defining the chamber, with one leading up one side and one leading up the other side of the chamber. In this way, greater overall rigidity in the components of the cell is achieved.

A cell constructed as described has been used in the measurement of optical characteristics of a sample, with the volume of sample required to purge out old sample and fill chamber 14 with new sample being substantially less than the volume required with cells typically available. To illustrate, a cell was prepared having a chamber volume of approximately 0.2 cc. It was found that purging of old sample and the deposit of a new sample in the chamber, with such new sample substantially free of contamination, could be accomplished using only about 0.5 cc of new sample. These figures, of course, are to be considered as illustrative only.

While an embodiment of the invention has been described it should be obvious that changes and variations are possible without departing from the invention.

It is claimed and desired to secure by letters patent:

1. A flow cell for containing fluid during the making of an analysis thereof comprising means defining a chamber including windows provided at a set of opposed extremities of said chamber, and flow-through supply conduit means and exhaust conduit means for the supplying and exhausting of fluid to and from said chamber during flow of fluid through the cell, said chamber having opposed walls bounding another set of opposed extremities of said chamber lying in a dimension transverse to the dimension having said windows, said supply and said exhaust conduit means communicating with said chamber through one wall of said other set of opposed walls, whereby fluid entering the chamber enters while flowing counter to the flow of fluid leaving said chamber, said supply conduit means comprising branched conduit portions with one conduit portion communicating with said chamber at one location which is adjacent one window and another conduit portion communicating with said chamber at another location adjacent the other window, said exhaust conduit means communicating with said chamber at a third location intermediate said one and said other locations.

2. The flow cell of claim 1, wherein said one and said other conduit portions straddle said means defining the chamber in regions leading to said one and said other locations.

3. The flow cell of claim 1, wherein each of said supply and said exhaust conduit means includes a tube section, said tube sections extending out from opposite ones of said other set of opposed extremities of said chamber, the tube section of said supply conduit means connecting with said branched conduit portions of said supply conduit means.

4. A flow cell for containing fluid during the analysis thereof with light transmission through said fluid comprising an integral transparent body including portions defining a chamber for holding fluid and portions forming flow-through supply conduit means and exhaust conduit means for the supply and exhaust of fluid to and from said chamber during flow of fluid through the cell, the portions of said body defining said chamber including confronting spaced window regions adapted for the passage of light in a path therethrough and opposed walls bounding opposite extremities of said chamber in a direction extending transverse to the path of light through said window regions, said supply and said exhaust conduit means each communicating with said chamber through one wall of said opposed walls, whereby fluid entering the chamber enters while flowing counter to the flow of fluid leaving said chamber, one of said conduit means comprising branched conduit portions with one conduit portion communicating with said chamber at one location which is adjacent one of said window regions and another conduit portion communicating with said chamber at another location adjacent the other of said window regions, said other conduit means communicating with said chamber at a third location intermediate said one and said other locations.

5. The flow cell of claim 4, wherein said supply conduit means comprises a supply tube section projecting away from said chamber, from the extremity of the chamber bounded by the other wall of said opposed walls, having said branched conduit portions in joint communication therewith and said branched conduit portions straddling said chamber, and said exhaust conduit means comprises an exhaust tube section projecting away from said chamber, from the extremity of said chamber bounded by said one wall of said opposed walls.

* * * * *